(12) United States Patent
Michishita

(10) Patent No.: US 9,071,125 B2
(45) Date of Patent: Jun. 30, 2015

(54) SWITCHING REGULATOR, CONTROL METHOD THEREOF AND POWER-SUPPLY DEVICE

(71) Applicant: Yuusuke Michishita, Toyonaka (JP)

(72) Inventor: Yuusuke Michishita, Toyonaka (JP)

(73) Assignee: RICOH ELECTRONIC DEVICES CO., LTD., Osaka (JP)

( * ) Notice: Subject to any disclaimer, the term of this patent is extended or adjusted under 35 U.S.C. 154(b) by 170 days.

(21) Appl. No.: 13/761,390

(22) Filed: Feb. 7, 2013

(65) Prior Publication Data

US 2013/0208520 A1  Aug. 15, 2013

(30) Foreign Application Priority Data

Feb. 9, 2012 (JP) ................. 2012-025909

(51) Int. Cl.
  *H02M 3/156* (2006.01)
  *H02M 3/157* (2006.01)
  *H02M 7/04* (2006.01)

(52) U.S. Cl.
  CPC ............. *H02M 7/04* (2013.01); *H02M 3/156* (2013.01)

(58) Field of Classification Search
  CPC .......................... H02M 3/156; H02M 3/157
  USPC .................. 323/282, 283, 284, 285, 351
  See application file for complete search history.

(56) References Cited

U.S. PATENT DOCUMENTS

| | | | |
|---|---|---|---|
| 5,170,333 A * | 12/1992 | Niwayama ............ | 363/21.11 |
| 6,791,306 B2 | 9/2004 | Walters et al. | |
| 7,233,135 B2 | 6/2007 | Noma et al. | |
| 7,479,773 B2 | 1/2009 | Michishita | |
| 7,852,055 B2 | 12/2010 | Michishita | |
| RE43,414 E * | 5/2012 | Walters et al. ............ | 323/288 |
| 8,242,764 B2 | 8/2012 | Shimizu et al. | |
| 8,319,487 B2 | 11/2012 | Michishita et al. | |
| 2006/0202669 A1* | 9/2006 | Nishimori ................ | 323/283 |
| 2008/0024099 A1* | 1/2008 | Oki et al. ................ | 323/282 |
| 2008/0054873 A1* | 3/2008 | Inoue ...................... | 323/351 |
| 2009/0174384 A1 | 7/2009 | Michishita et al. | |
| 2009/0302820 A1 | 12/2009 | Shimizu et al. | |
| 2010/0181977 A1* | 7/2010 | Sohma .................... | 323/282 |
| 2011/0109290 A1* | 5/2011 | Tang et al. ............... | 323/282 |
| 2011/0169464 A1 | 7/2011 | Michishita et al. | |
| 2012/0038341 A1 | 2/2012 | Michishita et al. | |
| 2012/0217941 A1* | 8/2012 | Chen et al. ............... | 323/271 |

FOREIGN PATENT DOCUMENTS

| | | |
|---|---|---|
| JP | 3981083 | 7/2007 |
| JP | 4107209 | 4/2008 |
| JP | 2010-088218 | 4/2010 |

* cited by examiner

*Primary Examiner* — Timothy J Dole
*Assistant Examiner* — Sisay G Tiku
(74) *Attorney, Agent, or Firm* — Cooper & Dunham LLP

(57) ABSTRACT

A switching regulator configured to convert an input voltage input to an input terminal into a predetermined constant voltage by switching with at least two elements including a pair of switching elements or a switching element and a rectifying element, and output the converted voltage as an output voltage from an output terminal includes a comparison unit configured to compare a signal showing an oscillating frequency of the switching regulator with a signal showing a constant frequency, and a driver configured to delay a pulse signal generated by feeding-back a control signal and an output signal of the switching regulator according to the comparison result by the comparison unit with a predetermined time, and switch the input voltage by using the at least two elements based on the pulse signal after the delay.

10 Claims, 7 Drawing Sheets

SECOND EMBODIMENT

FIRST EMBODIMENT

SWITCHING REGULATOR, CONTROL METHOD THEREOF AND POWER-SUPPLY DEVICE

PRIORITY CLAIM

The present application is based on and claims priority from Japanese Patent Application No. 2012-025909, filed on Feb. 9, 2012, the disclosure of which is hereby incorporated by reference in its entirety.

BACKGROUND

1. Field of the Invention

The present invention relates to a switching regulator, control method thereof and power-supply device including the switching regulator. In particular, the present invention relates to a technique which controls an oscillating frequency of a nonlinear control method switching regulator.

2. Description of the Related Art

A nonlinear control method such as hysteresis control having a high response speed to a rapid load change has been recently adopted in the field of portable electronic devices including an industrial electronic device. The nonlinear control method controls ON/OFF of a switching element by directly comparing an output voltage with a reference voltage in a comparator without using an air lamp. With this configuration, a very high response speed is obtained in the nonlinear control because of the absence of delay due to the frequency characteristic of the air lamp generating in linear control and the absence of delay of a wasted time for one cycle of a switching operation. For example, JP4107209 B discloses a nonlinear control method switching regulator.

Stable switching with a high switching frequency may be requested for a nonlinear control method switching regulator. However, an equivalent series resistance (ESR) is very small, and an output voltage ripple is significantly reduced when a ceramic capacitor is used. For this reason, stable switching with a high switching frequency can not be performed. Consequently, a technique is used, which inputs to a comparator a composite voltage of an output voltage and a ripple voltage similar to an inductor current, and compares the composite voltage with a reference voltage in the comparator so as to control ON/OFF of a switching element. With this technique, stable switching can be achieved even with a high switching frequency. For example, JP3981083B discloses one example of the above technique.

In general, the switching frequency of a switching regulator fluctuates based on constants of an inductor and an output capacitor, input and output conditions of input and output voltages, or the like in a nonlinear control method without using an air lamp.

For this reason, characteristics of several applications including a communication device are deteriorated by the generation of undesired electromagnetic interference due to the fluctuation in the switching frequency.

FIG. 8 provides a circuit view of a nonlinear control method switching regulator according to a conventional example. FIG. 9 provides a timing chart of each signal of the switching regulator in FIG. 8. The operation of the switching regulator in FIG. 8 will be hereinbelow described.

In FIG. 8, the switching regulator according to the conventional example includes a comparator 1, reference voltage generation circuit 2, driving circuit 3, ripple generation circuit 4, voltage composite circuit 5, switching elements M1, M2, inductor L1 and capacitor C1. A load 100 is connected to an output terminal of the switching regulator. In this case, a feedback voltage Vfb is a composite voltage of an output voltage Vout and a ripple voltage Vripple similar to an inductor current. The ripple voltage Vripple is generated in the ripple generation circuit 4. The DC output voltage Vout sets the composite voltage of the output voltage Vout and the AC component of the ripple voltage Vripple as Vfb to be set only by the reference voltage Vref.

In FIG. 9, the ripple of the ripple voltage Vripple is illustrated as being considerably larger than the ripple of the output voltage Vout, and the ripple of the feedback voltage Vfb is illustrated as being the same as the ripple of the ripple voltage Vripple.

In FIG. 8, the comparator 1 compares the feedback voltage Vfb with the reference voltage Vref. When the feedback voltage Vfb drops below the reference voltage Vref, the output signal CMPOUT of the comparator 1 becomes a low level from a high level after a response delay time temp, In this case, the reference voltage Vref is generated in the reference voltage generation circuit 2. When the low level output signal CMPOUT is input to the driving circuit 3, a control signal PHSIDE controlling a switching element M1 becomes a low level, and a control signal NLSIDE controlling a switching element M2 becomes a low level. Namely, the switching element M1 is turned on, and the switching element M2 is turned off. A current is supplied to an inductor L1 from an input voltage Vin in response to the turning-on of the switching element M1, and an inductor current IL increases with the inclination of (Vin−Vout)/L.

When the inductor current IL exceeds an output current Iout upon the increase in the inductor current IL, a current flows in the capacitor C1, an electric charge is accumulated in the capacitor C1, and the output voltage Vout increases. The comparator 1 compares the reference voltage Vref with the feedback voltage Vfb. When the feedback voltage Vfb exceeds the reference voltage Vref, the output signal CMPOUT of the comparator 1 becomes a high level from a low level after the response delay time temp. When the high level output signal CMPOUT is input to the driving circuit 3, the control signal PHSIDE controlling the switching element M1 becomes a high level, and the control signal NLSIDE controlling the switching element M2 becomes a high level. Namely, the switching element M1 is turned off, and the switching element M2 is turned on. A current flows in the inductor L1 from a ground in response to the turning-on of the switching element M2, and the inductor current IL decreases with the inclination of Vout/L.

When the inductor current IL drops below the output current Iout upon the decrease in the inductor current IL, a current flows in the load 100 from the capacitor C1, and the output voltage Vout decreases. With the repetition of such an operation, the switching regulator in FIG. 8 stably outputs the output voltage.

As described above, according to the switching regulator of the conventional example, the oscillating frequency of the switching regulator is mostly determined based on the response delay time temp of the comparator 1. Namely, when the response delay time temp of the comparator 1 fluctuates, the oscillating frequency of the switching regulator fluctuates. The response delay time temp is affected by the amplitude and slew rate of the feedback voltage Vfb input to the comparator 1 in addition to the response characteristic of the comparator 1. The ripple voltage Vripple and the output voltage Vout fluctuate based on the input and output conditions of the input and output voltages and the constants of the capacitor and the inductor. Therefore, the oscillating frequency of the switching regulator fluctuates based on the input and output conditions of the input and output voltages and the constants of the capacitor and the inductor.

SUMMARY

It is, therefore, an object of the present invention to provide a switching regulator which can control an oscillating frequency of a nonlinear control method switching regulator in which a switching frequency fluctuates due to input and output conditions of input and output voltages and constants of a capacitor and an inductor, a control method thereof and a power-supply device including the switching regulator.

To attain the above object, one embodiment of the present invention provides a switching regulator configured to convert an input voltage input to an input terminal into a predetermined constant voltage by switching with at least two elements including a pair of switching elements or a switching element and a rectifying element, and output the converted voltage as an output voltage from an output terminal, including: a comparison unit configured to compare a signal showing an oscillating frequency of the switching regulator with a signal showing a constant frequency; and a driver configured to delay a pulse signal generated by feeding-back a control signal and an output signal of the switching regulator according to the comparison result by the comparison unit with a predetermined time, and switch the input voltage by using the at least two elements based on the pulse signal after the delay.

One embodiment of the present invention also provides a power-supply device comprising the switching regulator according one embodiment of the present invention.

One embodiment of the present invention also provides a method of controlling a switching regulator, configured to convert an input voltage input to an input terminal into a predetermined constant voltage by switching with at least two elements including a pair of switching elements or a switching element and a rectifying element, and output the converted voltage as an output voltage from an output terminal, including: a step of comparing a signal showing an oscillating frequency of the switching regulator with a signal showing a constant frequency; and a step of delaying a pulse signal generated by feeding-back a control signal and an output signal of the switching regulator according to the comparison result by the comparison unit with a predetermined time, and switching the input voltage by using the at least two elements based on the pulse signal after the delay.

BRIEF DESCRIPTION OF THE DRAWINGS

The accompanying drawings are included to provide further understanding of the invention, and are incorporated in and constitute a part of this specification. The drawings illustrate embodiments of the invention and, together with the specification, serve to explain the principle of the invention.

DESCRIPTION OF THE PREFERRED EMBODIMENT

Hereinafter, embodiments of the present invention will be described with reference to the drawings. In addition, the same reference numbers are applied to similar elements.

First Embodiment

Figure 1:
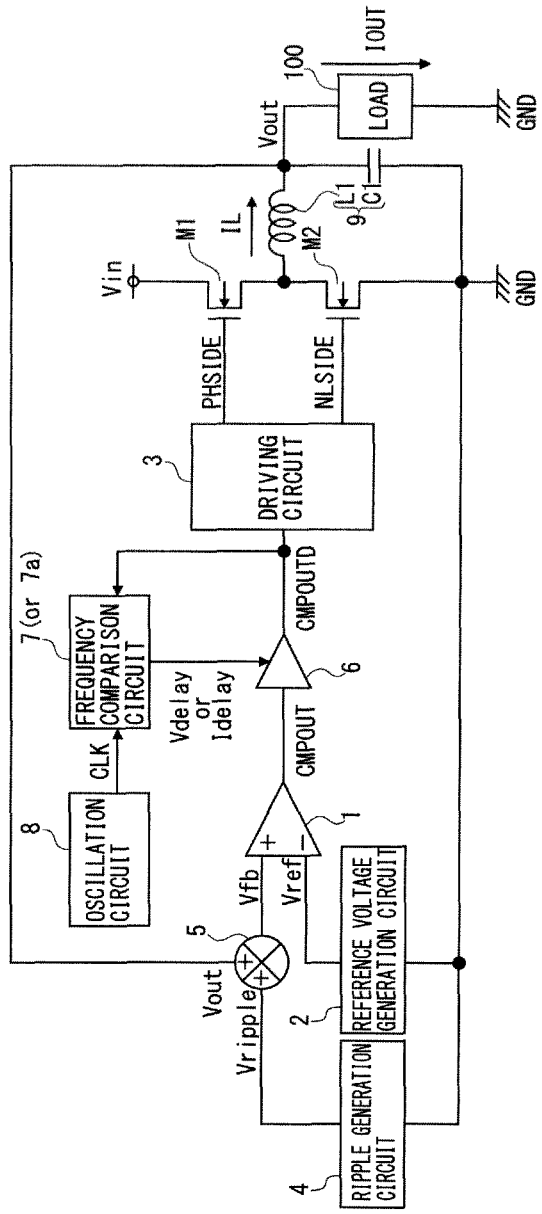
FIG. 1 is a circuit diagram illustrating a configuration of a switching regulator applied to a step-down DC/DC convertor according to a first embodiment of the present invention.
Figure 2:
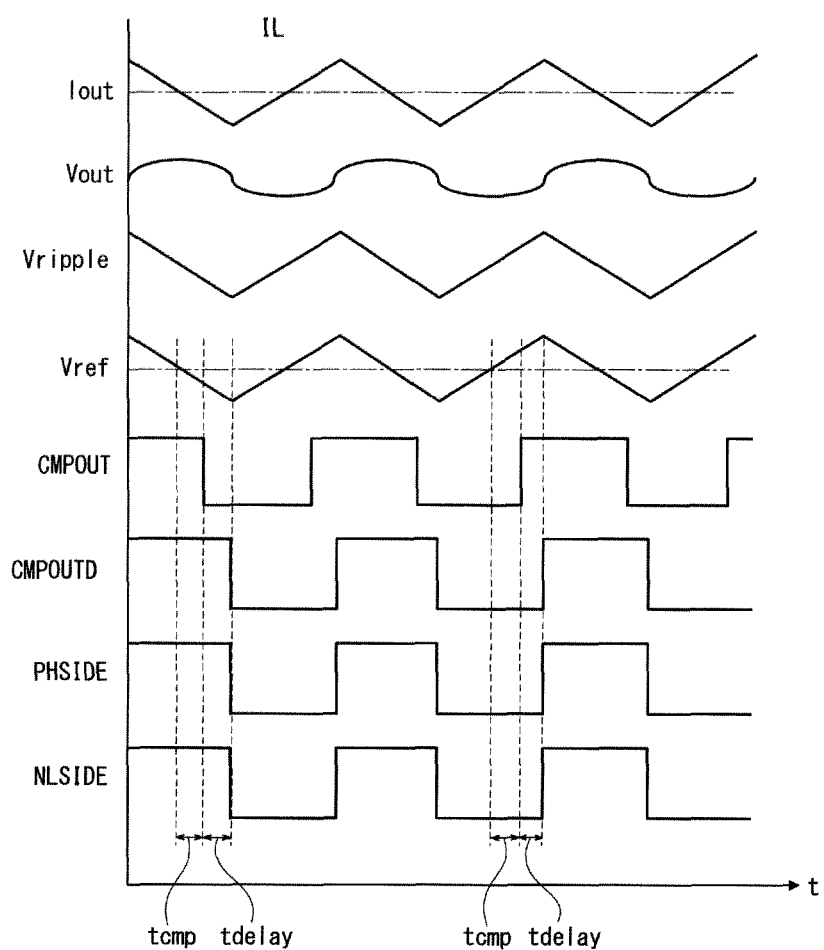
FIG. 2 is a timing chart of each signal illustrating an operation of the switching regulator in FIG. 1.
Figure 8:
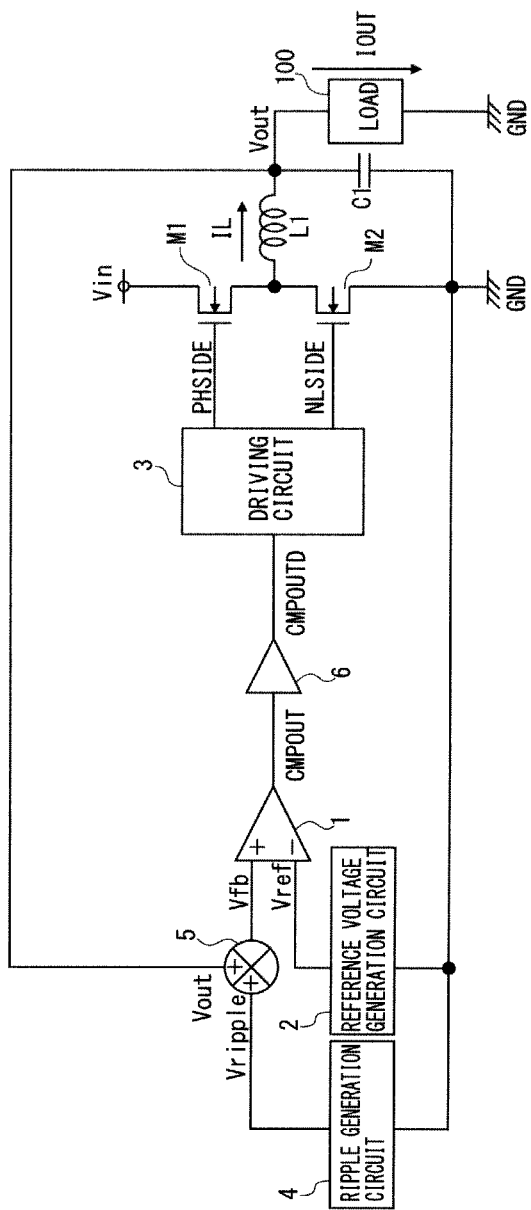
FIG. 8 is a circuit diagram illustrating a nonlinear control method switching regulator according to a conventional example.
Figure 9:
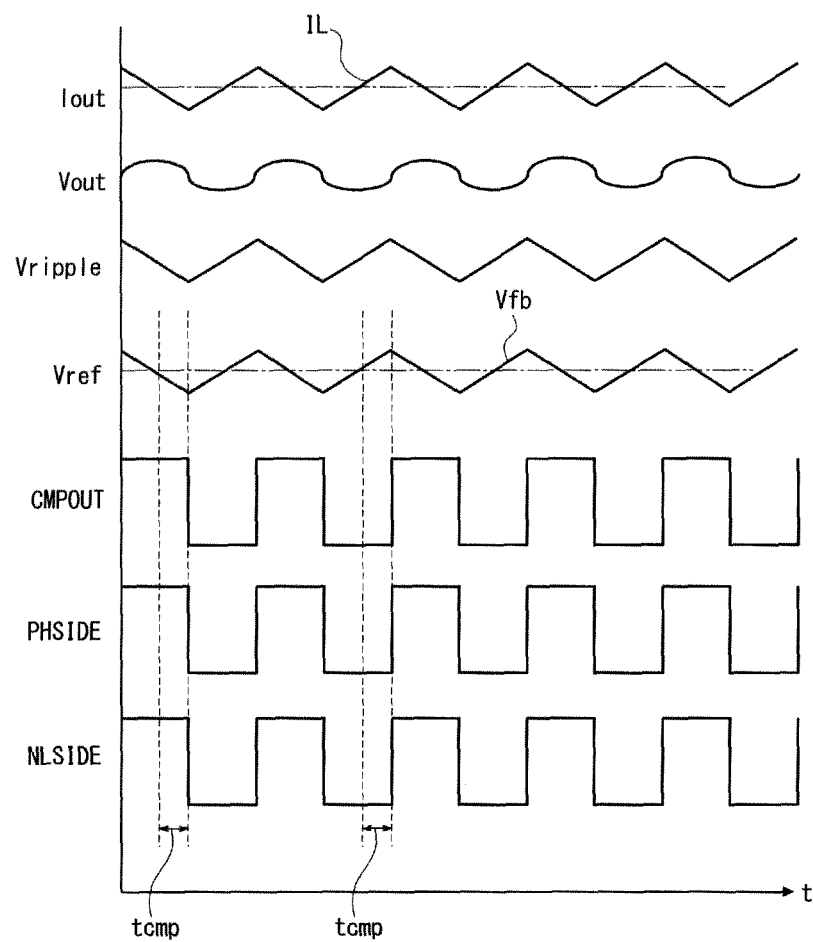
FIG. 9 is a timing chart of each signal of a switching regulator in FIG. 8.

FIG. 1 is a circuit diagram illustrating a configuration of a switching regulator applied to a step-down DC/DC convertor according to the first embodiment of the present invention. FIG. 2 is a timing chart of each signal illustrating the operation of the switching regulator in FIG. 1. The switching regulator according to the first embodiment further includes a delay circuit 6 and a frequency comparison circuit 7 in addition to the configuration of the switching regulator in FIG. 8. The switching elements M1, M2 are connected in series in the output circuit in the succeeding stage of the driving circuit 3. The connection point of the switching elements M1, M2 becomes the output terminal. The connection point is connected to the load 100 through the inductor L1. The output terminal of the switching regulator is connected to the ground through the smoothing capacitor C1. In this case, the inductor L1 and the capacitor C1 constitute the smoothing circuit 9.

In FIG. 1, the feedback voltage Vfb is a composite voltage of the output voltage Vout and the ripple voltage Vripple similar to an inductor current. The ripple voltage Vripple is generated in the ripple generation circuit 4. The DC output voltage Vout sets the composite voltage of the output voltage Vout and the AC component of the ripple voltage Vripple as Vfb to be set only by the reference voltage Vref. In addition, in FIG. 2, the ripple of the ripple voltage Vripple is illustrated as being considerably larger than the ripple of the output voltage Vout, and the ripple of the feedback voltage Vfb is illustrated as being the same as the ripple of the ripple voltage Vripple.

In FIG. 1, the comparator 1 compares the feedback voltage Vfb with the reference voltage Vref. When the feedback voltage Vfb drops below the reference voltage Vref, the output signal CMPOUT of the comparator 1 becomes a low level from a high level after the response delay time temp. The reference voltage Vref is generated in the reference voltage generation circuit 2. The output signal CMPOUT is input to the delay circuit 6, and a comparator delay signal CMPOUTD becomes a low level from a high level after the adjusted delay time. When the low level comparator delay signal CMPOUTD is input to the driving circuit 3, the control signal PHSIDE controlling the switching element M1 becomes a low level, and the control signal NLSIDE controlling the switching element M2 becomes a low level. Namely, the switching element M1 is turned on and the switching element M2 is turned off. A current is supplied to the inductor L1 from the input voltage Vin upon the turning-on of the switching eminent MI, and the inductor current IL increases with the inclination of (Vin−Vout)/L.

When the inductor current IL exceeds the output current Iout upon the increase in the inductor current IL, a current flows in the capacitor C1, an electric charge is accumulated in the capacitor C1, and the output voltage Vout increases. The comparator 1 compares the feedback voltage Vfb including the output voltage Vout with the reference voltage Vref. When the feedback voltage Vfb exceeds the reference voltage Vref, the output signal CMPOUT of the comparator 1 becomes a high level from a low level after the response delay time temp. The output signal CMPOUT is input to the delay circuit 6, and the comparator delay signal CMPOUTD becomes a high level from a low level after the adjusted delay time. When the high level comparator delay signal CMPOUTD is input to the driving circuit 3, the control signal PHSIDE controlling the switching element M1 becomes a high level, and the control signal NLSIDE controlling the switching element M2 becomes a high level. Namely, the switching element M1 is turned off and the switching element M2 is turned on. A current flows in the inductor L1 from the ground by the turning-on of the switching element M2, and the inductor current IL decreases with the inclination of Vout/L.

When the inductor current IL drops below the output current Iout upon a decrease in the inductor current IL, a current flows in the load 100 from the capacitor C1, and the output voltage Vout decreases. With the repetition of such operation, the switching regulator stably outputs an output voltage.

The comparator delay signal CMPOUTD which is a signal showing the oscillating frequency of the switching regulator and a clock signal CLK showing a constant frequency are input to the frequency comparison circuit 7. The signal showing the oscillating frequency of the switching regulator is not limited to the comparator delay signal CMPOUTD, and it can be any signal as long as it is a signal showing an oscillating frequency of a switching regulator. In addition, the clock signal CLK showing a constant frequency is generated in the oscillation circuit 8 provided inside or outside the switching regulator. The frequency comparison circuit 7 compares the frequency of the comparator delay signal CMPOUTD with the frequency of the clock signal CLK, and generates a voltage signal Vdelay or a current signal Idelay showing a delay time for determining the delay time of the delay circuit 6. The voltage signal Vdelay or the current signal Idelay is a voltage or a current adjusted in the frequency comparison circuit 7 such that the frequency of the comparator delay signal CMPOUTD showing the oscillating frequency of the switching regulator becomes a frequency similar to that of the signal CLK showing a constant frequency. The voltage signal Vdelay or the current signal Idelay is input to the delay circuit 6, and the output signal CMPOUT of the comparator 1 is output as the comparator delay signal CMPOUTD after the adjusted delay time.

As described above, according to the switching regulator of the present embodiment, the signal showing the oscillating frequency of the switching regulator is fed back, and the adjusted delay time is adopted in the feedback loop to obtain a constant frequency, so that the switching regulator can be controlled to switch with a desired frequency.

Second Embodiment

Figure 3:
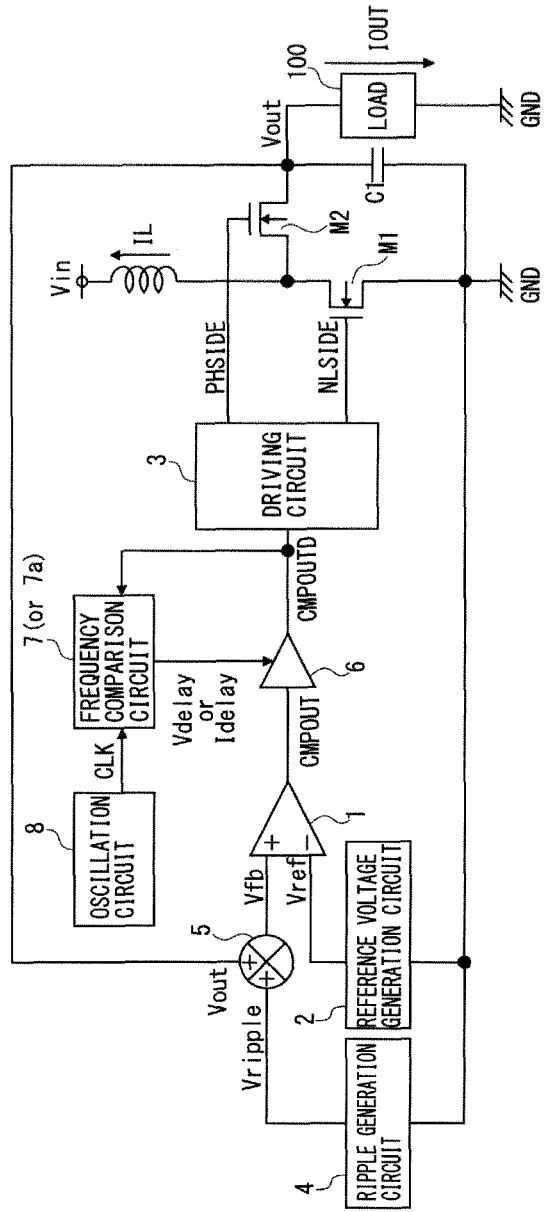
FIG. 3 is a circuit diagram illustrating a configuration of a switching regulator applied to a step-up DC/DC convertor according to a second embodiment of the present invention.

FIG. 3 is a circuit diagram illustrating a configuration of a switching regulator applied to a step-up DC/DC convertor according to a second embodiment of the present invention. The switching regulator in FIG. 1 is a step-down DC/DC convertor. However, the present invention is not limited thereto, and it can be applied to a step-up DC/DC convertor in FIG. 3. In addition, in FIG. 3, in the output circuit in the succeeding stage of the driving circuit 3, the switching element M1 and the inductor L1 are connected in series. The connection point of the switching element M1 and the inductor L1 is connected to the source of the switching element M2. The control signal PHSIDE from the driving circuit 3 is applied to the gate of the switching element M2. The drain of the switching element M2 becomes the output terminal of the switching regulator, and is connected to the ground through the smoothing capacitor C1 and also to the load 100.

As described above, according to the switching regulator of the present embodiment, the signal showing the oscillating frequency of the switching regulator is fed back, and the adjusted delay time is introduced in the feedback loop to obtain a constant frequency, so that the switching regulator can be controlled to switch with a desired frequency.

Figure 4:
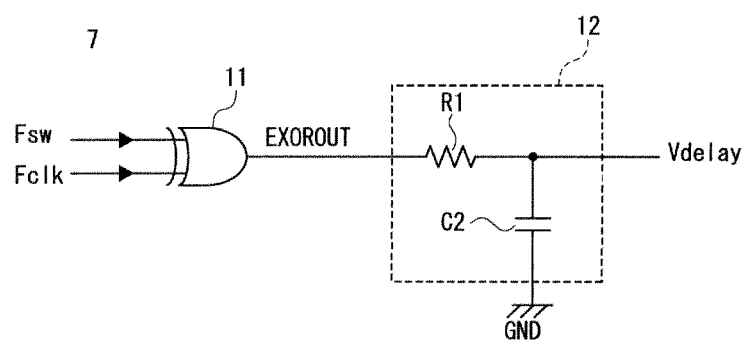
FIG. 4 is a circuit diagram illustrating a configuration of a frequency comparison circuit 7 (first embodiment) in FIG. 1 or FIG. 3.
Figure 5:
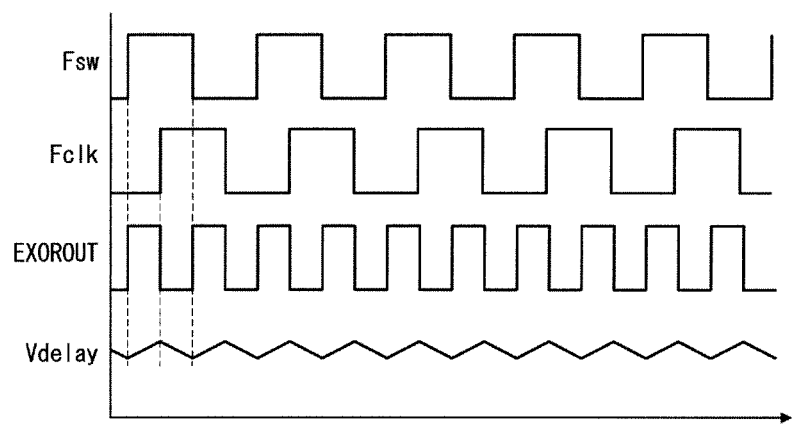
FIG. 5 is a timing chart of each signal illustrating an operation of the frequency comparison circuit 7 in FIG. 4.

FIG. 4 is a circuit diagram illustrating the configuration of the frequency comparison circuit 7 (first embodiment) in FIG. 1 or FIG. 3. FIG. 5 is a timing chart of each signal illustrating the operation of the frequency comparison circuit 7 in FIG. 4. In FIG. 4, the frequency comparison circuit 7 includes an EXOR circuit 11 and a CR integration circuit 12 having a resistance R1 and a capacitor C2, which timely integrates input signals to output the integrated signals.

In the frequency comparison circuit 7 in FIG. 4, a signal Fsw showing the oscillating frequency of the switching regulator and a signal Fclk showing a constant frequency of the clock signal CLK are used as inputs. In the signal Fsw and the signal Fclk, when one cycle is set with the combination of the high level time and the low level time, it is necessary to convert the signals Fsw, FclK by a not-shown frequency dividing circuit such that the high level time or the low level time becomes one cycle. The EXOR circuit 11 outputs the low level time and the high level time of a constant ratio as the output signal EXOROUT in a constant phase difference of the signal Fsw and the signal Fclk. The output signal EXOROUT is smoothed in a low-pass filter of the integration circuit 12 to output as the voltage signal Vdelay.

Figure 6:
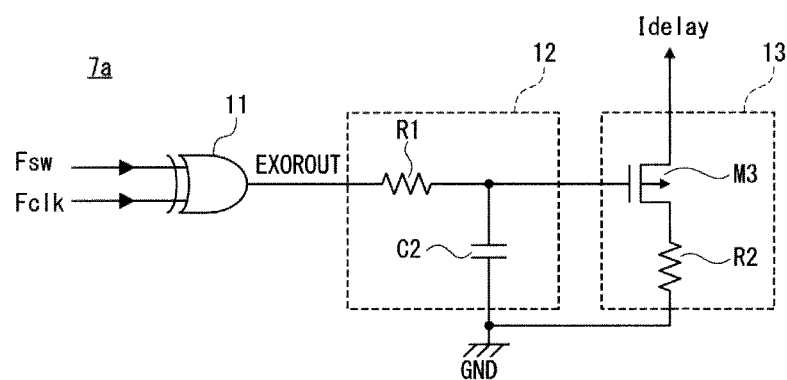
FIG. 6 is a circuit diagram illustrating a configuration of a frequency comparison circuit 7a (second embodiment) in FIG. 1 or FIG. 3.

FIG. 6 is a circuit diagram illustrating the configuration of the frequency comparison circuit 7a (second embodiment) in FIG. 1 or FIG. 3. The frequency comparison circuit 7a in FIG. 6 further includes a source follower circuit 13 having an N-channel transistor M3 and a resistance R2 in the succeeding stage of the integration circuit 12. In FIG. 6, the voltage corresponding to the voltage signal Vdelay in FIG. 4 is converted into a current in the source follower circuit 13 having the N-channel transistor M3 and resistance R2 to output as the current signal Idealy.

Figure 7:
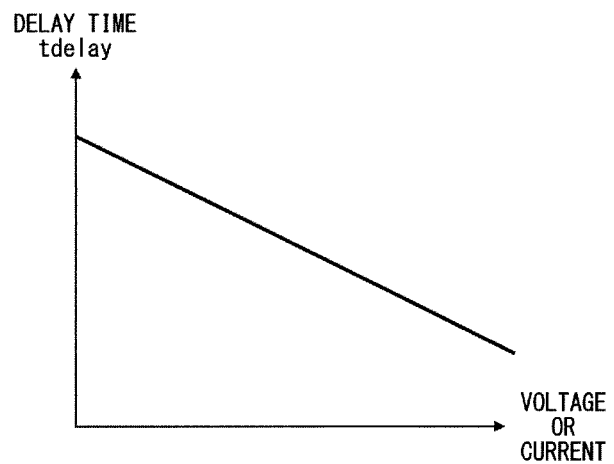
FIG. 7 is a graph illustrating a voltage characteristic or current characteristic of a delay time delay in a delay circuit 6 in FIG. 1 or FIG. 3.

FIG. 7 is a graph showing a current characteristic or voltage characteristic of the delay time tdelay in the delay circuit 6 in FIG. 1 or FIG. 3. FIG. 7 illustrates a primary decrease characteristic as one example. However, the present invention is not limited thereto as long as the delay time can be changed relative to the input of current or voltage. However, the input of the current or the voltage relative to a certain delay time should be one value. Namely, the delay time should be a monotonic increase or monotonic decrease relative to a voltage or a current. The increase or the decrease is selected such that the frequency feedback loop of the delay circuit 6, the frequency comparison circuit 7 and the signal Fsw showing the oscillating frequency of the switching regulator becomes a negative feedback. If the input is not one value, the converging frequency becomes two points. As a result, a desired constant switching frequency can not be obtained.

In the above embodiments, the switching regulator applicable to a DC/DC convertor is described, but the switching regulator can be used as a power-supply device of an electronic device such as a cellular phone or a multimedia player.

In the above embodiments, a pair of switching elements M1, M2 is used. However, the present invention is not limited to the above embodiments. The output circuit of the switching regulator can be constituted by using at least two elements including a pair of switching elements or a switching element and a rectifying element.

As described above, according to the embodiments of the present invention, the oscillating frequency of the nonlinear control method switching regulator in which the switching frequency is changed due to the input and output conditions of the input and output voltages and the constants of the inductor and the capacitor can be controlled. With this configuration, the switching frequency does not fluctuate, and undesired electromagnetic interference is not generated. Consequently, the deterioration in the characteristic of the application can be prevented.

In addition, in the embodiments of the present invention, the oscillation circuit, frequency comparison circuit and comparator constitute a comparison unit configured to compare the signal showing the oscillating frequency of the switching regulator with the signal showing a constant frequency, and the delay circuit and the driving circuit constitute a driver configured to delay the pulse signal generated by feeding-back the control signal and the output signal of the switching regulator according to the comparison result by the comparison unit with a predetermined time, and switch the input voltage by using the at least two elements based on the pulse signal after the delay.

Although the embodiments of the present invention have been described above, the present invention is not limited thereto. It should be appreciated that variations may be made in the embodiments described by persons skilled in the art without departing from the scope of the present invention.

What is claimed is:

1. A switching regulator configured to convert an input voltage input to an input terminal into a predetermined constant voltage by switching with at least two elements including a pair of switching elements or a switching element and a rectifying element, and output the converted voltage as an output voltage from an output terminal, comprising:
   a comparison unit configured to compare a signal showing an oscillating frequency of the switching regulator with a signal showing a constant frequency; and
   a driver configured to delay a pulse signal generated by feeding-back a control signal and an output signal of the switching regulator according to the comparison result by the comparison unit with a predetermined time, and switch the input voltage by using the at least two elements based on the pulse signal after the delay,
   wherein the comparison unit includes an oscillation circuit configured to generate the signal showing a constant frequency, and output the signal, a frequency comparison circuit configured to compare the signal showing the oscillating frequency of the switching regulator with the signal showing a constant frequency, and output a signal corresponding to the comparison result, and a comparator configured to compare a proportional voltage proportional to the output voltage or a composite voltage of the proportional voltage and a ripple voltage generated by a ripple generation circuit with a predetermined reference voltage, and output a signal of the comparison result, and
   the driver includes a delay circuit configured to delay the output signal of the comparator based on the signal corresponding to the comparison result with a delay time according to the comparison result, and output the output signal, and a driving circuit configured to generate a control signal to the at least two elements based on the output signal of the delay circuit, and output the control signal.

2. The switching regulator according to claim 1 further comprising a smoothing circuit including an inductor and a capacitor, configured to smooth the output voltage, wherein
   the at least two elements are connected in series, and include a first switching element and a second switching element connected between the input voltage and a ground, and
   the second switching element flows a current to the inductor when the first switching element is turned off.

3. The switching regulator according to claim 1, wherein the switching regulator is controlled such that the oscillating frequency of the switching regulator is set to be a frequency similar to a constant frequency generated inside or outside the switching regulator.

4. The switching regulator according to claim 1, wherein the frequency comparison circuit includes an EXOR circuit configured to output, with the signal showing the oscillating frequency of the switching regulator and the signal showing a constant frequency as inputs, a signal showing an EXOR calculation result of the signals, and an integration circuit configured to timely integrate the signal from the EXOR circuit, and output a signal corresponding to the comparison result.

5. The switching regulator according to claim 4, wherein the frequency comparison circuit is configured to output the signal from the integration circuit as a voltage signal.

6. The switching regulator according to claim 5, wherein the frequency comparison circuit includes a source follower circuit configured to convert the voltage signal from the integration circuit into a current signal.

7. The switching regulator according to claim 6, wherein the delay circuit is configured to delay the output signal of the comparator based on the current signal with a delay time according to the current signal, and output the output signal.

8. The switching regulator according to claim 5, wherein the delay circuit is configured to delay the output signal of the comparator based on the voltage signal with a delay time according to the voltage signal, and output the output signal.

9. A power-supply device comprising the switching regulator according to claim 1.

10. A method of controlling a switching regulator, configured to convert an Input voltage input to an input terminal into a predetermined constant voltage by switching with at least two elements including a pair of switching elements or a switching element and a rectifying element, and output the converted voltage as an output voltage from an output terminal, comprising:
   a step performed by a comparison unit of the switching regulator of comparing a signal showing an oscillating frequency of the switching regulator with a signal showing a constant frequency; and
   a step performed by a driver of the switching regulator of delaying a pulse signal generated by feeding-back a control signal and an output signal of the switching regulator according to the comparison result by the comparison unit with a predetermined time, and switching the input voltage by using the at least two elements based on the pulse signal after the delay,
   wherein the comparison unit includes an oscillation circuit configured to generate the signal showing a constant frequency, and output the signal, a frequency comparison circuit configured to compare the signal showing the oscillating frequency of the switching regulator with the signal showing a constant frequency, and output a signal corresponding to the comparison result, and a comparator configured to compare a proportional voltage proportional to the output voltage or a composite voltage of the proportional voltage and a ripple voltage generated by a ripple generation circuit with a predetermined reference voltage, and output a signal of the comparison result, and the driver includes a delay circuit configured to delay the output signal of the comparator based on the signal corresponding to the comparison result with a delay time according to the comparison result, and output the output signal, and a driving circuit configured to generate a control signal to the at least two elements based on the output signal of the delay circuit, and output the signal.

* * * * *